United States Patent
Skoniecki et al.

(10) Patent No.: US 11,447,045 B2
(45) Date of Patent: Sep. 20, 2022

(54) VEHICLE SEAT FRAME STRUCTURE AND VEHICLE SEAT

(71) Applicant: Faurecia Autositze GmbH, Stadthagen (DE)

(72) Inventors: Artur Skoniecki, Warsaw (PL); Bartosz Kowalski, Warsaw (PL); Grzegorz Wójtowicz, Rochester Hills, MI (US)

(73) Assignee: Faurecia Autositze GmbH, Stadthagen (DE)

( * ) Notice: Subject to any disclaimer, the term of this patent is extended or adjusted under 35 U.S.C. 154(b) by 0 days.

(21) Appl. No.: 17/314,240

(22) Filed: May 7, 2021

(65) Prior Publication Data

US 2021/0347284 A1 Nov. 11, 2021

(30) Foreign Application Priority Data

May 7, 2020 (DE) ...................... 10 2020 112 459.7

(51) Int. Cl.
*B60N 2/20* (2006.01)
*B60N 2/22* (2006.01)
*B60N 2/68* (2006.01)

(52) U.S. Cl.
CPC .................. *B60N 2/20* (2013.01); *B60N 2/22* (2013.01); *B60N 2/682* (2013.01)

(58) Field of Classification Search
CPC ........... B60N 2/20; B60N 2/22; B60N 2/3013
See application file for complete search history.

(56) References Cited

U.S. PATENT DOCUMENTS

| 6,164,723 | A | 12/2000 | Ganot |
| 8,348,346 | B2* | 1/2013 | Li ............................ B60N 2/20 |
| | | | 297/301.4 |
| 2017/0246968 | A1 | 8/2017 | Adamik |
| 2018/0050618 | A1* | 2/2018 | Schanderl ............ B60N 2/3011 |
| 2018/0236906 | A1 | 8/2018 | Pluta |

FOREIGN PATENT DOCUMENTS

| CN | 208602363 | A | | 3/2019 |
| CN | 112046345 | A | * | 12/2020 |
| DE | 19915863 | A1 | | 10/1999 |
| DE | 102010020570 | A1 | | 11/2011 |
| DE | 102011081347 | A1 | | 3/2012 |
| DE | 102012010421 | A1 | | 8/2013 |
| DE | 102014220405 | A1 | | 4/2016 |

(Continued)

*Primary Examiner* — Timothy J Brindley
(74) *Attorney, Agent, or Firm* — The Sladkus Law Group

(57) ABSTRACT

The present disclosure relates to a vehicle seat frame structure comprising a backrest frame part and a seat cushion frame part. The backrest frame part and the seat cushion frame part are supported by a pivot bearing for being pivoted about a pivot axis. A spring device is biased with the pivoting movement. The spring device is only effective in a comfort inclination angular region. If the backrest frame part is pivoted out of the comfort inclination angular region towards the front, the spring device is released from the force flow between the backrest frame part and the seat cushion frame part. The release is provided by a shaft-hub-connection between a coupling section of a shaft and a hub of a hub body, the shaft-hub-connection comprising an angular clearance.

8 Claims, 9 Drawing Sheets

(56) References Cited

FOREIGN PATENT DOCUMENTS

| | | | | |
|---|---|---|---|---|
| DE | 102016115266 A1 | * | 2/2018 | ............... B60N 2/22 |
| FR | 2889123 A1 | * | 2/2007 | ............... B60N 2/20 |
| FR | 2901336 A1 | * | 11/2007 | ............... B60N 2/22 |
| JP | 2019018721 A | | 2/2019 | |
| KR | 20180112296 A | * | 10/2018 | |

* cited by examiner

VEHICLE SEAT FRAME STRUCTURE AND VEHICLE SEAT

PRIORITY CLAIM

This application claims priority to German Patent Application No. DE 10 2020 112 459.7, filed May 7, 2020, which is expressly incorporated by reference herein.

BACKGROUND

The present disclosure relates to a vehicle seat frame structure and a vehicle seat comprising at least one vehicle seat frame structure. More particularly, the present disclosure relates to a vehicle seat of a rear vehicle seat row wherein the inclination angle of the backrest relative to the seat cushion or seat cushion part can be adapted and latched by the user, for example manually, according to the needs in a comfort inclination angular region.

SUMMARY

According to the present disclosure, a vehicle seat frame structure which comprises a backrest frame part mounted to a backrest and a seat cushion frame part mounted to a seat cushion. The frame structure parts can be embodied as struts, might comprise a mounting flange and the like and/or might be a part of the supporting structure of the vehicle seat. The vehicle seat frame structure is arranged, for example, in a lateral side region of the vehicle seat and the supporting structure of the same where in particular one vehicle seat frame structure is arranged on each side and the two vehicle seat frame structures have the same construction, have an equivalent function or might have a different design.

In illustrative embodiments, a vehicle seat frame structure which is improved with respect to the actuation characteristic for adjusting the inclination of the backrest relative to the seat cushion and/or with respect to a compact design.

In the vehicle seat frame structure, the backrest frame part and the seat cushion frame part are supported on each other by a pivot bearing for being pivoted about a pivot axis. The pivot bearing allows the provision of different inclination angles of the backrest frame part relative to the seat frame part. Within the frame of the present disclosure, a suitable device for manually adjusting and latching the inclination angle (in particular in a comfort inclination angular region) is provided as well as a suitable device for the free pivoting of the backrest frame part in a free pivoting inclination angular region which ends at the loading space inclination angle. A securing of an achieved inclination angle might be provided by a generally suitable latching or locking device.

For influencing the force conditions when pivoting the backrest relative to the seat cushion for changing the inclination angle the vehicle seat frame structure comprises a spring device. The spring device is arranged in a force flow between the backrest frame part and the seat cushion frame part. The spring device biases the backrest frame part with a moment about the pivot axis having a direction for reducing the inclination angle of the backrest frame part relative to the seat cushion frame part. Said in different words, the spring device generates a moment which supports the pivoting of the backrest to the front relative to the seat cushion by the user.

In illustrative embodiments, a coupling device is integrated into the force flow between the backrest frame part, the spring device and the seat cushion frame part. Here, the spring device is not effective over the whole pivoting region for changing the inclination angle. Instead, the coupling device separates the force flow in an uncoupling angular region of the inclination angular region of the backrest frame part. Preferably, the uncoupling angular region correlates with the inclination angular region between the front end region of the comfort inclination angular region and the loading space inclination angle (so the free pivoting inclination angular region). This means that for folding the backrest to the front the force flow is separated so that the moment generated by the spring device does not bias the backrest in the uncoupling angular region. Instead, the user is able to freely pivot the backrest without any support by the spring device (and without a force generated by the spring device opposing the movement). Here, it is nevertheless also possible that in the uncoupling angular region the pivoting of the backrest is supported by the weight of the backrest or by a different device.

In illustrative embodiments, the coupling device is embodied as a shaft-hub-connection comprising a clearance. The shaft-hub-connection comprises a shaft and a hub. Here, within the frame of the present disclosure, any suitable shaft-hub-connection might be used as long as the shaft-hub-connection comprises a clearance. The clearance provides the separation of the force flow in the uncoupling angular region. Additional to providing an advantageous way for influencing the force characteristic of the vehicle seat frame structure, this embodiment also provides a very compact design by the integration of the uncoupling clearance into the shaft-hub-connection.

In one example, there is a separation of the force flow by the coupling device in a way controlled by motion corresponding to the relative pivoting of the backrest frame part relative to the seat cushion frame part in the uncoupling angular region. Accordingly, when the user pivots the backrest in front direction, the uncoupling is achieved by the control of the movement by the user. Preferably, this uncoupling takes place at the front end region of the comfort inclination angular region.

The uncoupling angular region might be arranged in any region within the whole inclination angular region. Preferably, the uncoupling angular region begins when the backrest frame part is completely folded (so when the loading space inclination angle has been reached). Alternatively or cumulatively, the uncoupling angular region ends at a first locking orientation of the backrest frame part which might be the beginning of the comfort inclination angular region.

In illustrative embodiments, a follower is formed by a shaft of the shaft-hub-connection. Another follower is formed by a hub of the shaft-hub-connection. The two followers establish a follower contact in the coupling angular region. By the follower contact, a moment generated by the spring device about the pivot axis is transmitted. This moment in particular is directed for reducing the inclination angle. For the mentioned example, the follower contact of the two followers provides a coupling of the shaft of the shaft-hub-connection to the hub of the shaft-hub-connection for transferring the moment and for pivoting the hub and the shaft by a common pivoting movement. Instead, the two followers do not establish a follower contact in the uncoupling angular region: in the uncoupling angular region the followers are arranged remote from each other and separate from each other so that it is not possible to transmit a moment over the coupling device. In the uncoupling angular region the shaft and the hub can be rotated relative to each other. In the uncoupling angular region the distance of the two followers depends on the inclination angle. Within the frame of the present disclosure it is possible that the moment is transmitted by a follower contact only between a single couple of followers. In particular for reducing the bias of the followers and of the surface pressures in the follower contact it is also possible that at least two follower contacts with associated couples of followers are provided. In this case, the transmitted moment can be divided on the at least two follower contacts.

In illustrative embodiments, any spring device can be used. Here, it is e.g. possible that one single spring is used or a plurality of springs is used, the plurality of springs being arranged in a mechanical serial arrangement or parallel arrangement and/or providing a bias in the same direction or in different directions. It is possible that the spring device comprises an elastomeric body, is embodied as a pressure spring or tension spring and the like. Preferably, according to the present disclosure the spring device is embodied as a spiral spring. The shaft-hub-connection comprising the clearance is in particular coupled to the radial inner spring base of the spiral spring.

For a very compact design the shaft-hub-connection is arranged radially inside from the outer surface of the spiral spring and does not extend on the outside of the spiral spring. It is even possible that the shaft-hub-connection is arranged radially inside from the inner surface or spiral surface of the spiral spring and does not extend outside from the inner surface of the spiral spring.

In illustrative embodiments, there are a lot of options for the force characteristic of the spring device and the moment created in the coupling angular region for biasing the backrest frame part and supporting the user. It is e.g. possible that in the coupling angular region the force or the moment generated by the spring device depends linearly or with any non-linear characteristic (in particular a curve-shaped characteristic) on the inclination angle. The transition of the force of the spring device or of the moment generated by the spring device for the transition from the coupling angular region to the uncoupling angular region might be a transition with a jump to a zero force or zero moment. For one proposal of the present disclosure, the moment generated by the spring device about the pivot axis directed for reducing the inclination angle becomes smaller when approaching the lower limit of the uncoupling angular region and the moment becomes zero without any jump when arriving at the lower limit of the uncoupling angular region. In this way, the support of the movement of the backrest by the spring device ends at the transition from the coupling angular region to the uncoupling angular region without any force jump so that the transition is not sensed by the user.

In illustrative embodiments, a vehicle seat wherein at least one vehicle seat frame structure (in particular one vehicle seat frame structure on each side) is used, the vehicle seat frame structure being embodied as described above.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
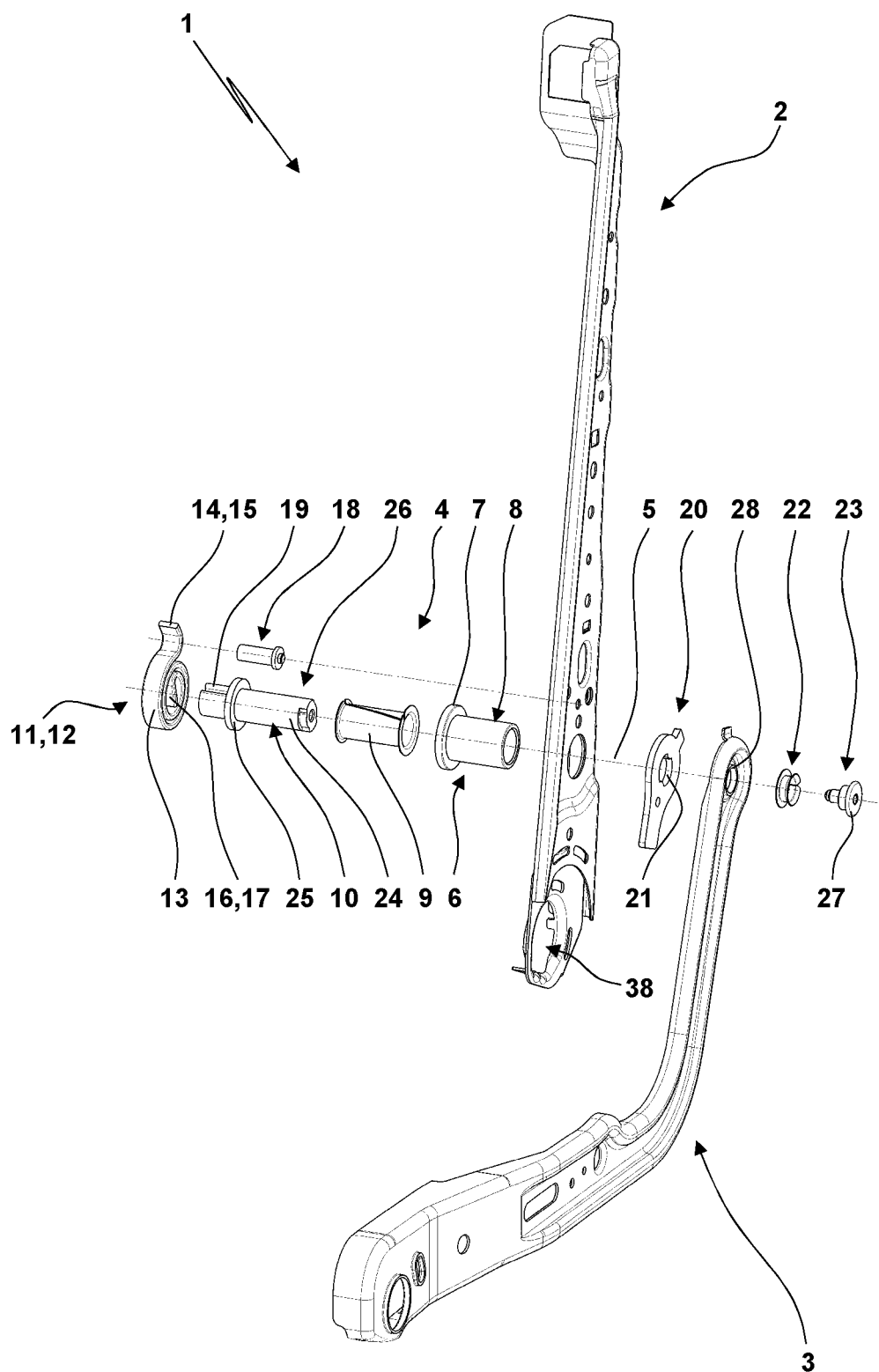
FIG. 1 shows a vehicle seat frame structure in an exploded view.

Referring now in greater detail to the drawings, FIG. 1 shows a vehicle seat frame structure 1 in a three-dimensional exploded view. The vehicle seat frame structure 1 comprises a backrest frame part 2 on which the backrest of the vehicle seat is held and a seat cushion frame part 3 on which a seat cushion of the vehicle seat is held. The backrest frame part 2 and the seat cushion frame part 3 are supported on each other by a pivot bearing 4 for being pivoted about a pivot axis 5. A pivoting of the backrest relative to the vehicle or vehicle body can be provided by a recliner about a pivot axis (not shown here) having an orientation parallel to the pivot axis 5. The accommodation 38 of the recliner in the backrest frame part 2 can be seen in FIG. 1.

The pivot bearing 4 comprises a bearing lug 6. The bearing lug 6 is embodied as a bearing sleeve 8 which comprises a collar 7 and which is rigidly connected to the backrest frame part 2 at an accommodating bore. A plain bearing bush 9 is arranged in the bearing lug for being rotated about the pivot axis 5. A shaft 10 is supported for being rotated about the pivot axis 5 in the plain bearing bush 9.

The vehicle seat frame structure 1 comprises a spring device 11 here embodied as a spiral spring 12. The spiral spring 12 comprises a spiral body 13 and an outer leg 14 forming an outer spring base 15 and comprising an inner leg 16 forming an inner spring base 17.

The outer spring base 15 is (at least in the coupling angular region) supported on the backrest frame part 2. For the shown embodiment, the support is provided by a supporting bolt 18 mounted or fixed to the backrest frame part 2.

The inner spring base 17 is supported under fixation against rotation on the shaft 10. For the shown embodiment, the shaft 10 comprises a slit 19 in the end region where the spiral spring 12 is supported on the shaft 10. The inner leg 16 of the spiral spring 12 is accommodated in the slit 19 with a form lock in circumferential direction and held therein under fixation against rotation.

The vehicle seat frame structure 1 comprises a hub body 20 which forms a hub 21. The hub body 20 is mounted or fixed to the seat cushion frame part 3.

The vehicle seat frame structure 1 comprises a sleeve-like bearing body 22 and a securing screw 23.

Figure 2:
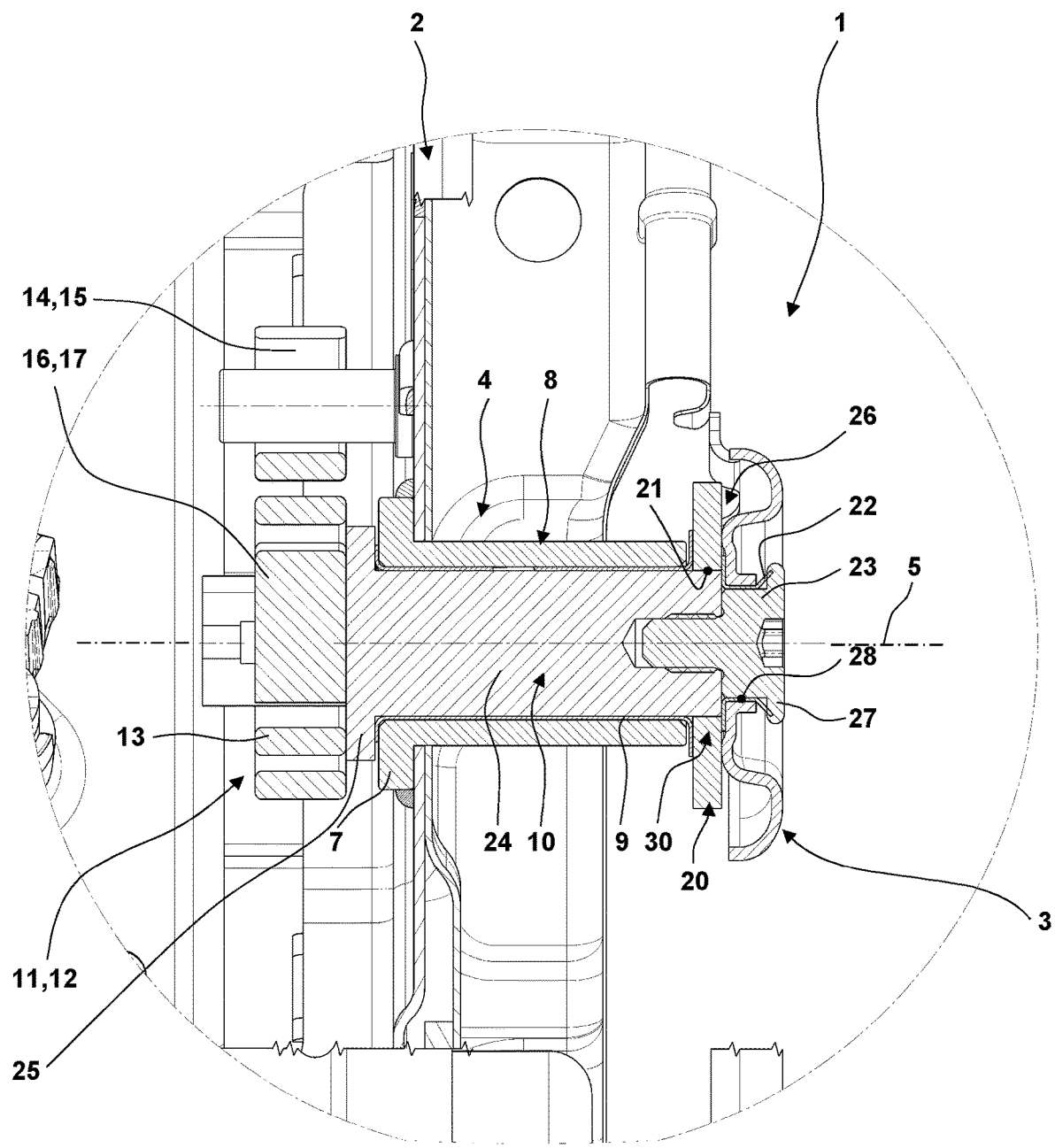
FIG. 2 shows a part of a cross section of the assembled vehicle seat frame structure.
Figure 3:
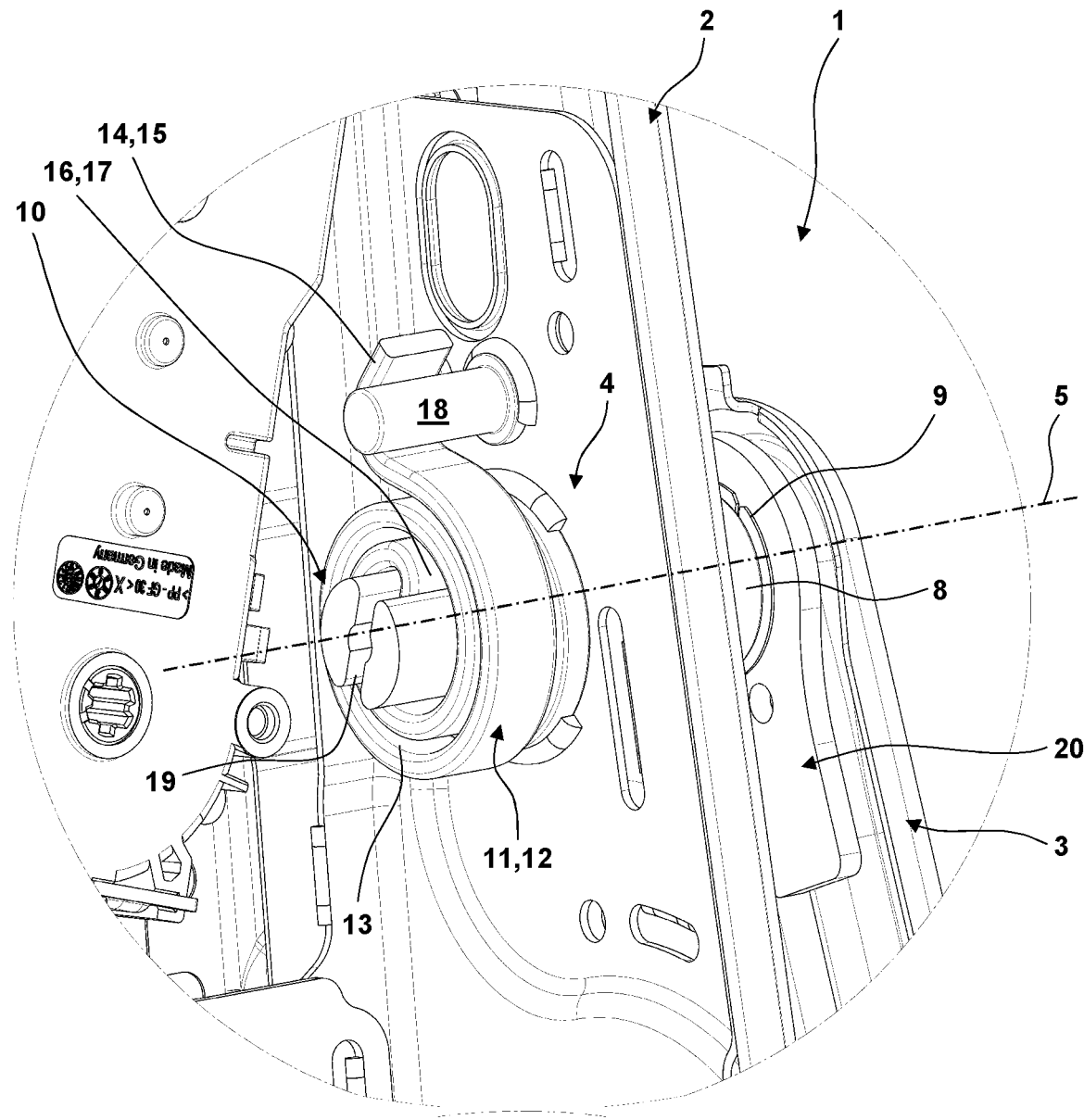
FIG. 3 shows the assembled vehicle seat frame structure in a three-dimensional view.

FIGS. 2 and 3 show the assembled vehicle seat frame structure 1. The collar 7 of the bearing sleeve 8 is welded to the backrest frame part 2. The shaft 10 comprises a collar 25 at a location between the slit 19 and the shaft body 24. The shaft 10 is supported by the collar 25 on the collar 7 in axial direction under interposition of the plain bearing bush 9. The hub 21 is slid and fitted to an end-sided coupling region 26 of the shaft 10 and supported in axial direction by the plain bearing bush 9 on the bearing sleeve 8. The securing screw 23 comprises a sleeve-like collar 27. Under interposition of the bearing body, the bearing lug 28 of the seat cushion frame part 3 receives the securing screw 23. The bearing lug 28 is axially trapped between the front side of the shaft 10 and the collar 27 of the securing screw 23.

Figure 4:
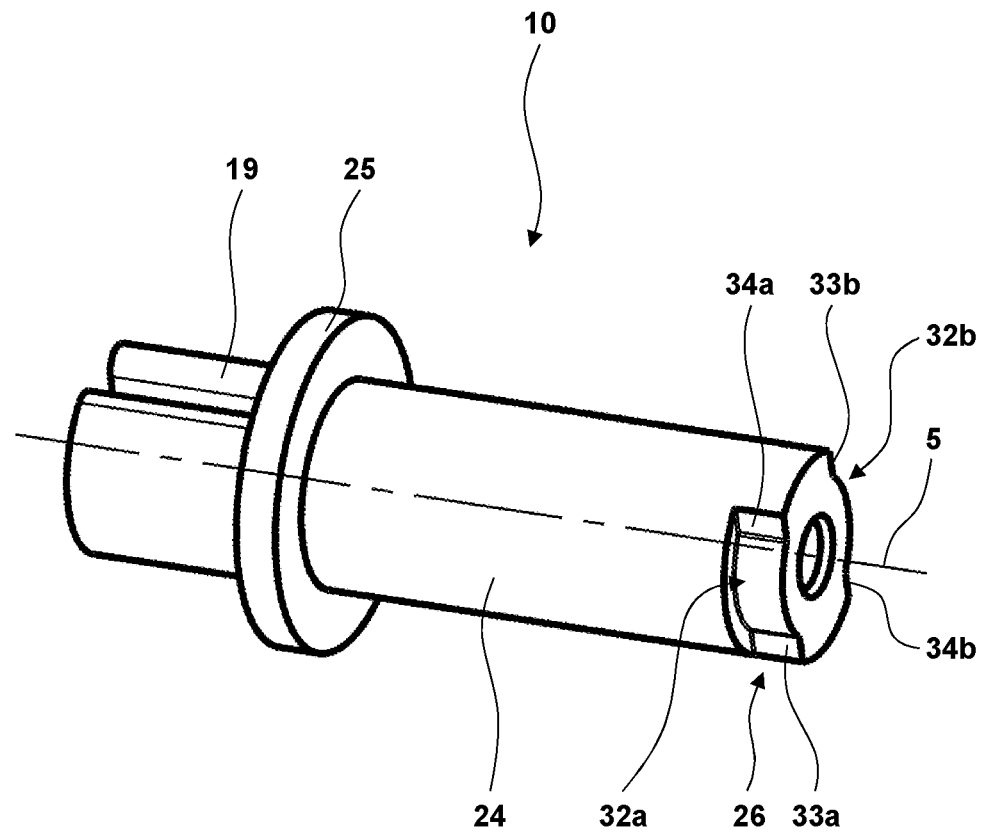
FIG. 4 shows a shaft of the vehicle seat frame structure of FIGS. 1-3 in a three-dimensional view.
Figure 5:
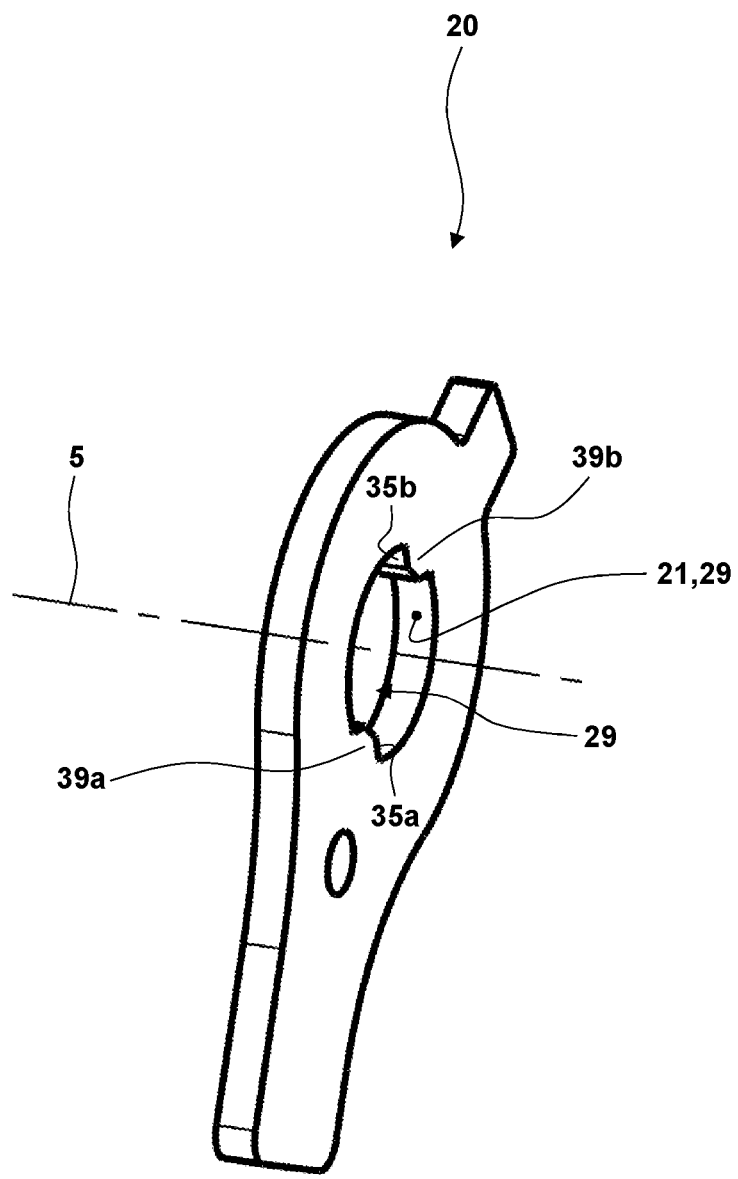
FIG. 5 shows a hub body of the vehicle seat frame structure of FIGS. 1-3 in a three-dimensional view.

FIGS. 4 and 5 show the shaft 10 and the hub body 20 as single components in a three-dimensional view. The coupling section 26 of the shaft 10 is connected to a coupling section of the hub body 20. In the coupling sections 26, 29 the shaft 10 and the hub body 20 establish a shaft-hub-connection 30 which provides a clearance 31 in circumferential direction.

The coupling section 26 of the shaft 10 comprises circumferential groove sections 32a, 32b. The circumferential groove sections 32a, 32b are limited in circumferential direction by radial steps. The steps provide or form followers 33a, 33b and stops 34a, 34b.

The hub 21 comprises cylinder segment surfaces being connected to each other by protrusions having an orientation in radial inner direction and forming followers 35a, 35b.

When assembling the hub body 20 with the coupling section 29 to the coupling section 26 of the shaft 10, the protrusions forming the followers 35a, 35b are accommodated in the associated circumferential groove sections 32a, 32b. For transmitting the moment generated by the spring device 11 the follower 33a (respectively 33b) and the follower 35a (respectively 35b) contact each other under the establishment of a follower contact 36a (respectively 36b). Here, the circumferential extension of the circumferential groove sections 32a, 32b defines a clearance or play (in the following clearance) 31. The clearance 31 corresponds to the difference of the circumferential extension of the circumferential groove sections 32a, 32b and the circumferential extension of the protrusions. The cylinder segment surfaces of the hub 21 contact the outer cylinder segment surfaces of the shaft 10 for providing a guidance for the rotational movement about the pivot axis 5.

Generally, it would be sufficient that one single follower 35a, 35b is received in one single circumferential groove section 32a, 32b for providing the coupling with the clearance. However, for the shown embodiment two circumferential groove sections 32a, 32b are arranged on opposite sides of the shaft 10 which then each cooperate with an associated follower 35a, 35b of the hub body 20. In this way, it is possible to provide an increased mechanical strength and in some cases also a symmetric coupling.

Within the frame of the present disclosure, also a kinematic reversal is possible in the way that the shaft 10 comprises at least one radial protrusion forming a follower which is then received with a clearance in an accommodation of the hub 21 of the hub body 20.

Figure 6:
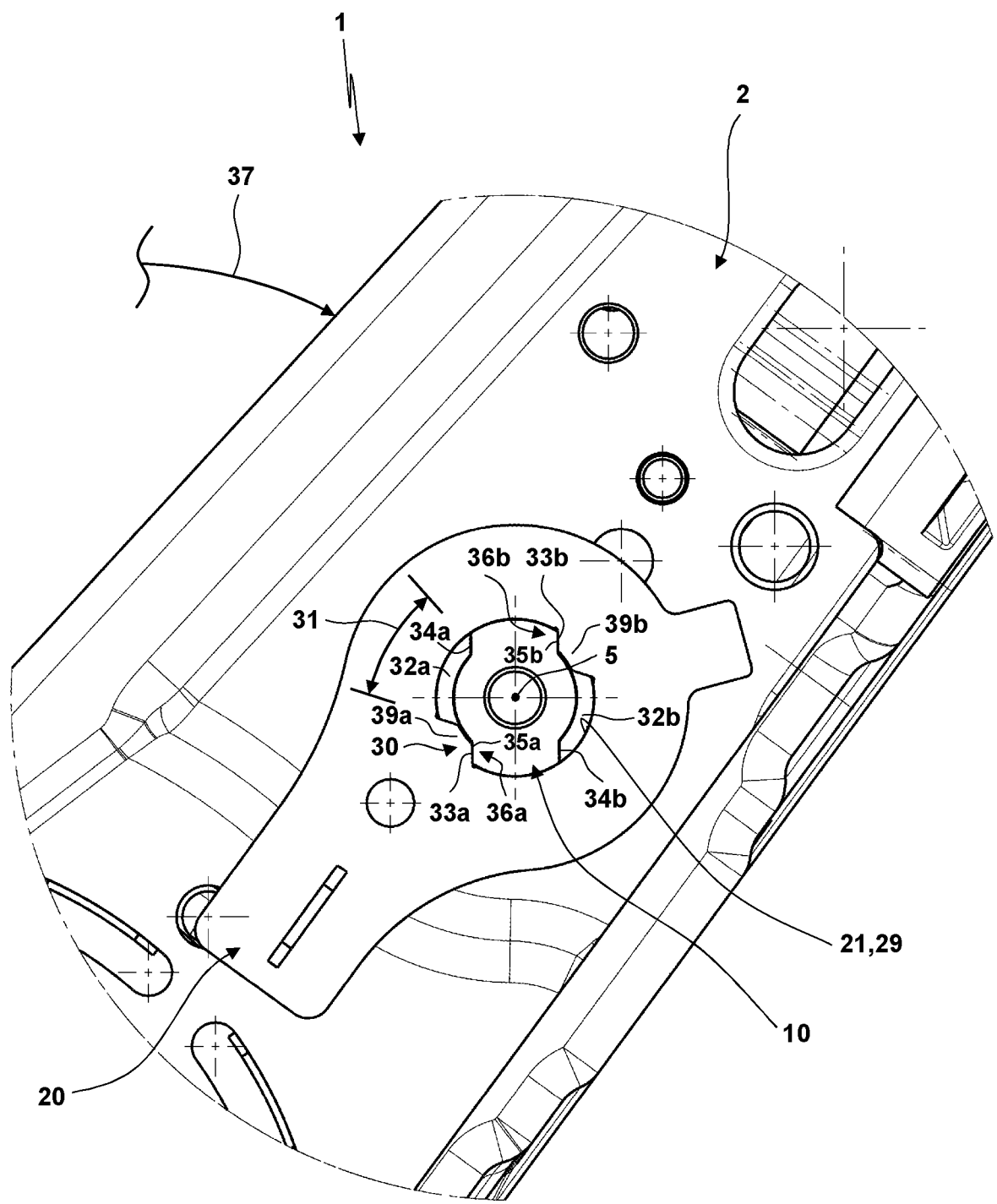
FIGS. 6-9 show the vehicle seat frame structure of FIGS. 1-3 in the region of the shaft of FIG. 4 and the hub body of FIG. 5 in a side view for different inclination angles.

FIG. 6 shows the vehicle seat frame structure 1 in an orientation completely unfolded in backward direction. In this orientation the inclination angle 37 of the backrest and the backrest frame part 2 has its maximum. For this inclination angle (which is the maximum angle in the comfort inclination angular region) the spring device 11 has its maximum tension. For this maximum tension the spring device preferably applies a returning moment on the backrest frame part 2 directed towards the front in the region of 25 to 50 Nm, in particular in the region of 30 to 45 Nm. In this operational orientation the shaft 10 is pressed by the spring device 11 with the followers 33a, 33b against the followers 35a, 35b of the hub 21. By the follower contacts 36a, 36b the moment is transmitted between the backrest frame part 2 and the seat cushion frame part 3.

Figure 7:
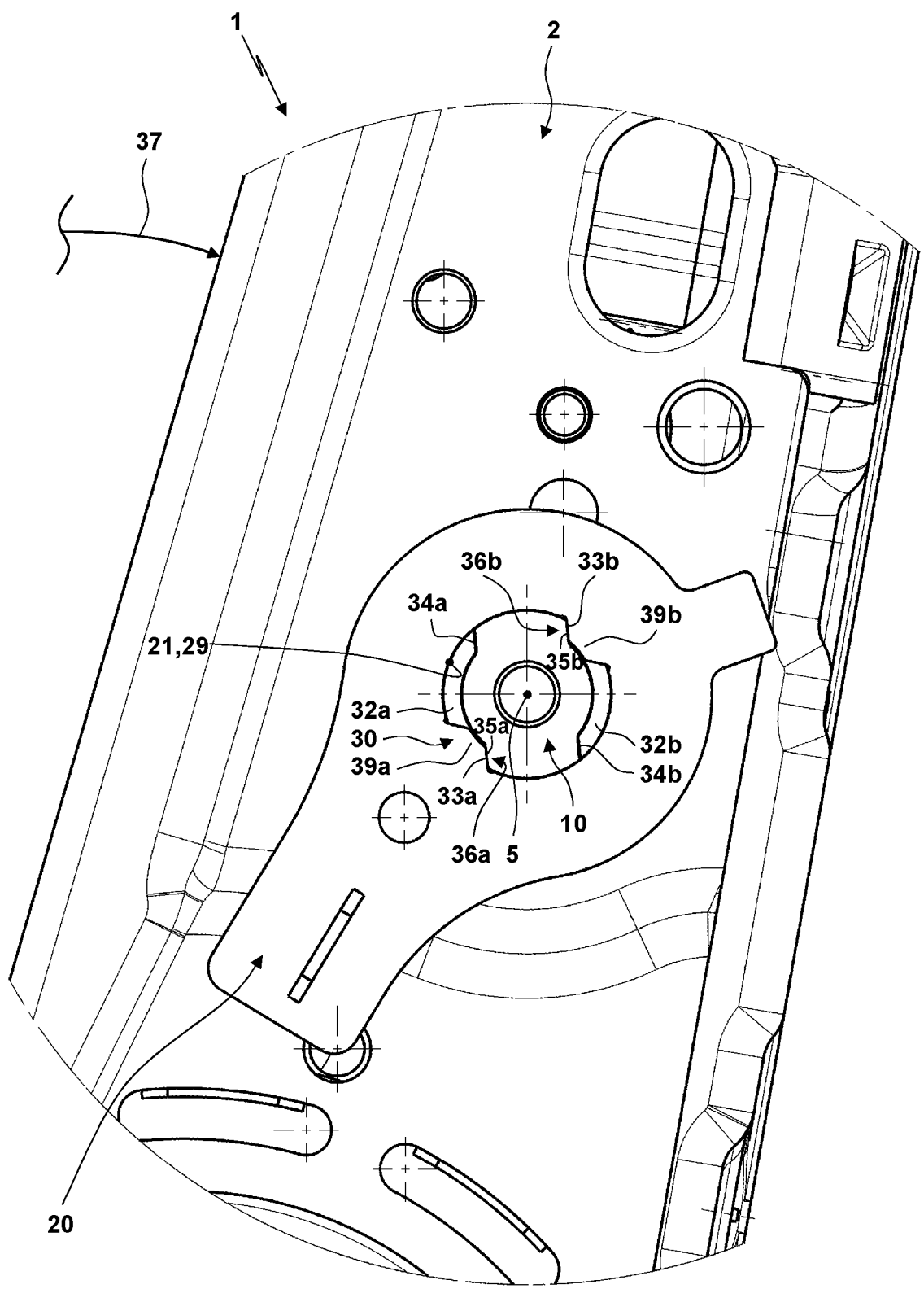

When transferring the backrest frame part 2 from the orientation of FIG. 6 into a predefined base orientation of FIG. 7, which is also denoted as "design-orientation", the spring device 11 supports this pivoting movement of the backrest frame part 2 towards the front. With this pivoting movement and the reduction of the inclination angle 37 between the backrest frame part 2 and the seat cushion frame part 3 simultaneously the tension of the spring device 11 is reduced. In the operational orientation of FIG. 7, the moment generated by the spring device 11 is already reduced. During the movement from the inclination angle of FIG. 6 to the inclination angle of FIG. 7 the follower contacts 36a, 36b between the followers 33a, 35a and 33b, 35b transmit the moment so that the folding of the backrest frame part 2 towards the front is supported.

Figure 8:
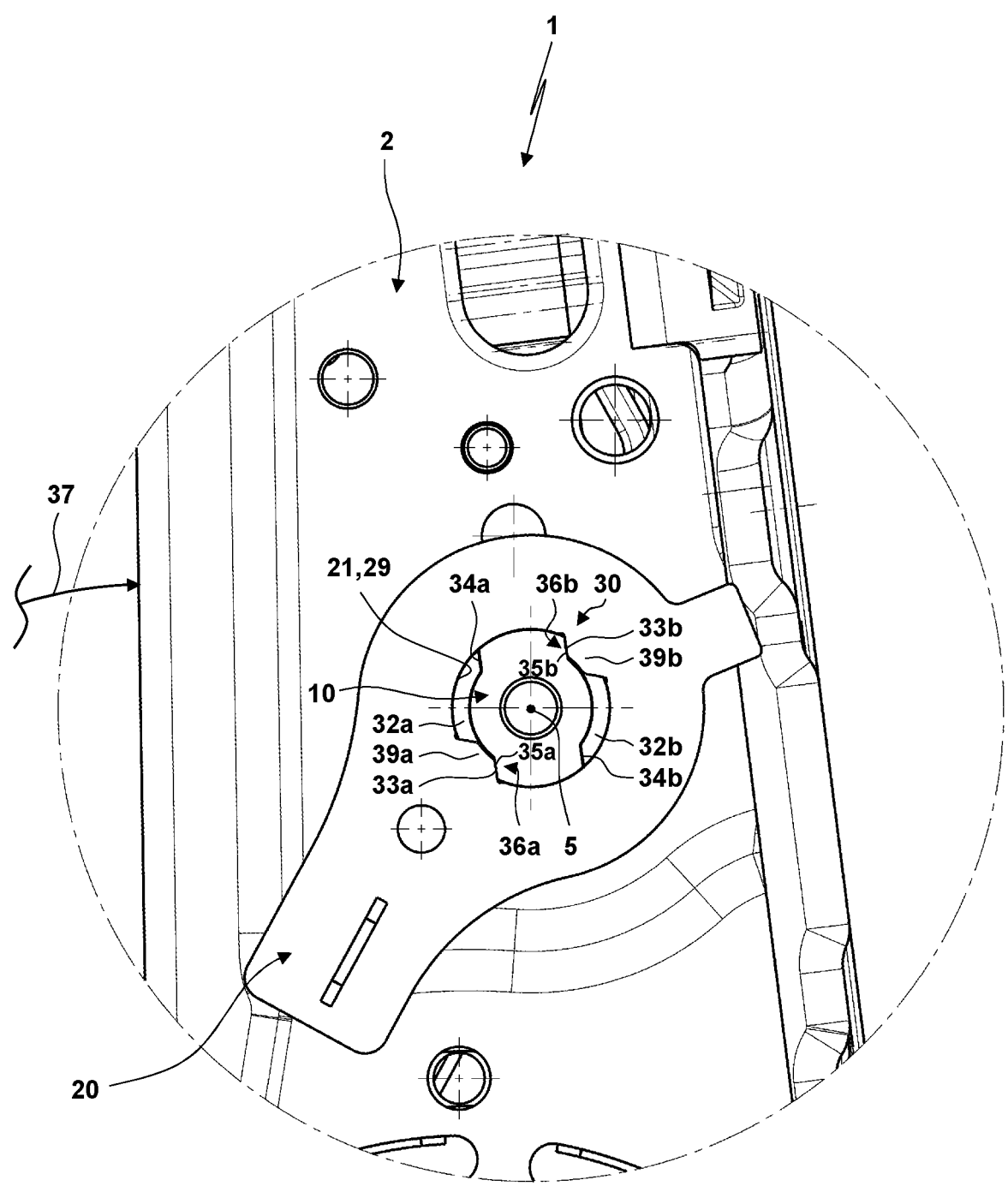

FIG. 8 shows the vehicle seat frame structure 1 in an orientation still further folded towards the front. Preferably, the inclination angle 37 shown in FIG. 8 is the front end region of the comfort inclination angular region and so represents the transition to the free pivoting inclination angular region. Also for the movement from the inclination angle of FIG. 7 to the inclination angle of FIG. 8, the pivoting movement is supported by the spring device 11. However, during this support the tension of the spring device 11 is successively further reduced corresponding to the reduction of the inclination angle and the moment successively reduces. In the operational orientation of FIG. 8, the spring device 11 has arrived at the non-tensioned base orientation wherein the spring device 11 is not tensioned and the moment applied by the spring device 11 upon the backrest frame part 2 is zero.

Figure 9:
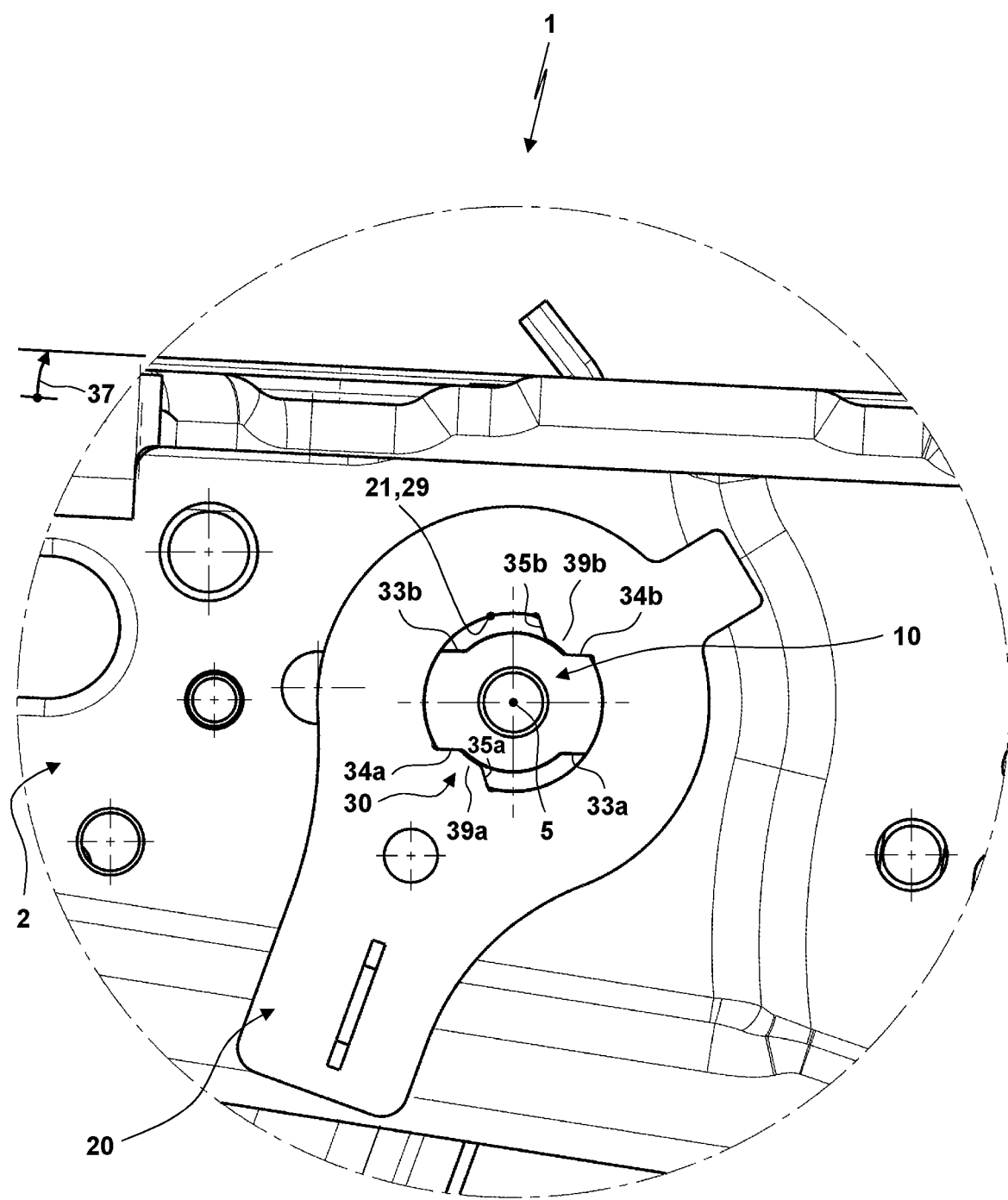

When starting from the inclination angle of FIG. 8 and leaving the comfort inclination angular region the backrest frame part 2 is pivoted still further towards the front. With the reduction of the inclination angle 37 the follower contacts 33a, 35a as well as 33b, 35b separate from each other. With the further decrease of the inclination angle 37 the distance between the followers 33a, 33b of the shaft 10 and the associated followers 35a, 35b of the hub 21 increases so that the backrest frame part 2 can be pivoted without changing the tension of the spring device 11. The spring device 11 is not deflected during this pivoting movement. During this pivoting movement ending with the loading space inclination angle shown in FIG. 9, the clearance 31 becomes effective. Without this necessarily being the case, the minimum inclination angle 37 can be defined by the contact of the protrusions 39a, 39b with the stops 34a, 34b.

The followers 33, 35 have a smaller radial distance from the pivot axis 5 than the radial innermost winding of the spiral body 13 of the spiral spring 12.

Many variations and modifications may be made to the preferred embodiments of the present disclosure without departing substantially from the spirit and principles of the present disclosure. All such modifications and variations are intended to be included herein within the scope of the present disclosure, as defined by the following claims.

The following applies with respect to the disclosure—not the scope of protection—of the original application and the patent: Further features may be taken from the drawings, in particular from the illustrated designs and the dimensions of a plurality of components with respect to one another as well as from their relative arrangement and their operative connection. The combination of features of different embodiments of the present disclosure or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the present disclosure do not have the features mentioned in the claims which, however, does not apply to the independent claims of the granted patent.

The number of the features mentioned in the claims and in the description is to be understood to cover this exact number and a greater number than the mentioned number without having to explicitly use the adverb "at least". For example, if an element is mentioned, this is to be understood such that there is exactly one element or there are two elements or more elements. Additional features may be added to these features, or these features may be the only features of the respective product.

The reference signs contained in the claims are not limiting the extent of the matter protected by the claims. Their sole function is to make the claims easier to understand.

Other features and advantages of the present disclosure will become apparent to one with skill in the art upon examination of the following drawings and the detailed description. It is intended that all such additional features and advantages be included herein within the scope of the present disclosure, as defined by the claims.

The present disclosure generally relates to a vehicle seat frame structure and a vehicle seat comprising at least one vehicle seat frame structure. Preferably, the vehicle seat is a vehicle seat of a rear vehicle seat row wherein the inclination angle of the backrest relative to the seat cushion or seat cushion part can be adapted and latched by the user (preferably manually) according to the needs in a comfort inclination angular region. Here, it is possible to pivot the backrest relative to the seat cushion part in a free pivoting inclination angular region in front direction until the backrest arrives at a loading space inclination angle for which the backrest has an orientation as far as possible parallel to the seat cushion of the vehicle seat. When the backrest is in the loading space inclination angle it is possible to position a piece of luggage or another transportation object and the like behind the backrest and/or it is possible to increase the volume of the loading space or luggage compartment up to the space above the folded backrest. It is possible that the vehicle seat frame structure or the vehicle seat is used in a second or third seat row of a vehicle which is in particular an SUV or off-road vehicle.

The present disclosure proposes a vehicle seat frame structure which comprises a backrest frame part mounted to a backrest and a seat cushion frame part mounted to a seat cushion. The frame structure parts can be embodied as struts, might comprise a mounting flange and the like and/or might be a part of the supporting structure of the vehicle seat. The vehicle seat frame structure is preferably arranged in a lateral side region of the vehicle seat and the supporting structure of the same where in particular one vehicle seat frame structure is arranged on each side and the two vehicle seat frame structures have the same construction, have an equivalent function or might have a different design.

The present disclosure in particular proposes a vehicle seat frame structure which is improved with respect to the actuation characteristic for adjusting the inclination of the backrest relative to the seat cushion and/or with respect to a compact design.

In the vehicle seat frame structure, the backrest frame part and the seat cushion frame part are supported on each other by a pivot bearing for being pivoted about a pivot axis. The pivot bearing allows the provision of different inclination angles of the backrest frame part relative to the seat frame part. Within the frame of the present disclosure, a suitable device for manually adjusting and latching the inclination angle (in particular in a comfort inclination angular region) is provided as well as a suitable device for the free pivoting of the backrest frame part in a free pivoting inclination angular region which ends at the loading space inclination angle. A securing of an achieved inclination angle might be provided by a generally suitable latching or locking device.

For influencing the force conditions when pivoting the backrest relative to the seat cushion for changing the inclination angle the vehicle seat frame structure comprises a spring device. The spring device is arranged in a force flow between the backrest frame part and the seat cushion frame part. The spring device biases the backrest frame part with a moment about the pivot axis having a direction for reducing the inclination angle of the backrest frame part relative to the seat cushion frame part. Said in different words, the spring device generates a moment which supports the pivoting of the backrest to the front relative to the seat cushion by the user.

According to the present disclosure, a coupling device is integrated into the force flow between the backrest frame part, the spring device and the seat cushion frame part. Here, the spring device is not effective over the whole pivoting region for changing the inclination angle. Instead, the coupling device separates the force flow in an uncoupling angular region of the inclination angular region of the backrest frame part. Preferably, the uncoupling angular region correlates with the inclination angular region between the front end region of the comfort inclination angular region and the loading space inclination angle (so the free pivoting inclination angular region). This means that for folding the backrest to the front the force flow is separated so that the moment generated by the spring device does not bias the backrest in the uncoupling angular region. Instead, the user is able to freely pivot the backrest without any support by the spring device (and without a force generated by the spring device opposing the movement). Here, it is nevertheless also possible that in the uncoupling angular region the pivoting of the backrest is supported by the weight of the backrest or by a different device.

Comparative vehicle seat frame structures comprise linkages for a spring device embodied as a spiral spring, the linkages requiring a large construction space. A coupling device being embodied as a coupling rocker having a large radial dimension and cooperating on the outer side of the spiral spring with a supporting bolt. On the other hand, a leg of the spiral spring forming the radial outer spring base contacts a radial outer supporting pin of the backrest frame part or a protrusion of the seat cushion frame part arranged radially outside from the spiral spring. Accordingly, for these comparative structures it is required to provide construction space radially outside from the spiral spring for these coupling devices.

According to the present disclosure, another solution is chosen: according to the present disclosure the coupling device is embodied as a shaft-hub-connection comprising a clearance. The shaft-hub-connection comprises a shaft and a hub. Here, within the frame of the present disclosure any suitable shaft-hub-connection might be used as long as the shaft-hub-connection comprises a clearance. The clearance provides the separation of the force flow in the uncoupling angular region. Additional to providing an advantageous way for influencing the force characteristic of the vehicle seat frame structure, this embodiment also provides a very compact design by the integration of the uncoupling clearance into the shaft-hub-connection.

For example, there is a separation of the force flow by the coupling device in a way controlled by motion corresponding to the relative pivoting of the backrest frame part relative to the seat cushion frame part in the uncoupling angular region. Accordingly, when the user pivots the backrest in front direction, the uncoupling is achieved by the control of the movement by the user. Preferably, this uncoupling takes place at the front end region of the comfort inclination angular region.

The uncoupling angular region might be arranged in any region within the whole inclination angular region. Preferably, the uncoupling angular region begins when the backrest frame part is completely folded (so when the loading space inclination angle has been reached). Alternatively or cumulatively, the uncoupling angular region ends at a first locking orientation of the backrest frame part which might be the beginning of the comfort inclination angular region.

According to the present disclosure, a follower is formed by a shaft of the shaft-hub-connection. Another follower is formed by a hub of the shaft-hub-connection. The two followers establish a follower contact in the coupling angular region. By the follower contact, a moment generated by the spring device about the pivot axis is transmitted. This moment in particular is directed for reducing the inclination angle. For the mentioned example, the follower contact of the two followers provides a coupling of the shaft of the shaft-hub-connection to the hub of the shaft-hub-connection for transferring the moment and for pivoting the hub and the shaft by a common pivoting movement. Instead, the two followers do not establish a follower contact in the uncoupling angular region: in the uncoupling angular region the followers are arranged remote from each other and separate from each other so that it is not possible to transmit a moment over the coupling device. In the uncoupling angular region the shaft and the hub can be rotated relative to each other. In the uncoupling angular region the distance of the two followers depends on the inclination angle. Within the frame of the present disclosure it is possible that the moment is transmitted by a follower contact only between a single couple of followers. In particular for reducing the bias of the followers and of the surface pressures in the follower contact it is also possible that at least two follower contacts with associated couples of followers are provided. In this case, the transmitted moment can be divided on the at least two follower contacts.

Within the frame of the present disclosure, any spring device can be used. Here, it is e.g. possible that one single spring is used or a plurality of springs is used, the plurality of springs being arranged in a mechanical serial arrangement or parallel arrangement and/or providing a bias in the same direction or in different directions. It is possible that the spring device comprises an elastomeric body, is embodied as a pressure spring or tension spring and the like. Preferably, according to the present disclosure the spring device is embodied as a spiral spring. The shaft-hub-connection comprising the clearance is in particular coupled to the radial inner spring base of the spiral spring.

For a very compact design the shaft-hub-connection is arranged radially inside from the outer surface of the spiral spring and does not extend on the outside of the spiral spring. It is even possible that the shaft-hub-connection is arranged radially inside from the inner surface or spiral surface of the spiral spring and does not extend outside from the inner surface of the spiral spring.

Within the frame of the present disclosure, there are a lot of options for the force characteristic of the spring device and the moment created in the coupling angular region for biasing the backrest frame part and supporting the user. It is e.g. possible that in the coupling angular region the force or the moment generated by the spring device depends linearly or with any non-linear characteristic (in particular a curve-shaped characteristic) on the inclination angle. The transition of the force of the spring device or of the moment generated by the spring device for the transition from the coupling angular region to the uncoupling angular region might be a transition with a jump to a zero force or zero moment. For one proposal of the present disclosure, the moment generated by the spring device about the pivot axis directed for reducing the inclination angle becomes smaller when approaching the lower limit of the uncoupling angular region and the moment becomes zero without any jump when arriving at the lower limit of the uncoupling angular region. In this way, the support of the movement of the backrest by the spring device ends at the transition from the coupling angular region to the uncoupling angular region without any force jump so that the transition is not sensed by the user.

The present disclosure also proposes a vehicle seat wherein at least one vehicle seat frame structure (in particular one vehicle seat frame structure on each side) is used, the vehicle seat frame structure being embodied as described above.

The invention claimed is:

1. A vehicle seat frame structure comprising
   a backrest frame part,
   a seat cushion frame part,
   a pivot bearing which connects the backrest frame part to the seat cushion frame part for being pivoted about a pivot axis and
   a spring device which comprises a first spring base and a second spring base, which is arranged in a force flow between the backrest frame part and the seat cushion frame part and which biases the backrest frame part with a moment about the pivot axis for reducing an inclination angle of the backrest frame part relative to the seat cushion frame part,
   a coupling device which is integrated into the force flow between the backrest frame part, the spring device and the seat cushion frame part, the coupling device being a shaft-hub-connection comprising a shaft and a hub and the shaft-hub-connection having a rotational clearance and the shaft-hub-connection interrupting the force flow in an uncoupling angular region of the inclination angle of the backrest frame part relative to the seat cushion frame part,
   the first spring base of the spring device being supported on the backrest frame part,
   the second spring base of the spring device being supported on the shaft,
   the shaft comprising a first follower,
   the hub being held by the backrest frame part and
   the hub comprising a second follower,
   the first follower and the second follower contacting each other in a coupling angular region for providing a transfer of the moment caused by the spring device about the pivot axis and being arranged remote from each other in the uncoupling angular region.

2. The vehicle seat frame structure of claim 1, wherein the coupling device interrupts the force flow in the uncoupling angular region in a way controlled by motion by a relative pivoting movement of the backrest frame part relative to the seat cushion frame part.

3. The vehicle seat frame structure of claim 2, wherein the uncoupling angular region starts when the backrest frame part has been completely folded and/or ends in a first locking position of the backrest frame part.

4. The vehicle seat frame structure of claim 1, wherein the first follower and the second follower establish a follower contact in the coupling angular region by which the moment about the pivot axis caused by the spring device is transmitted and are positioned remote from each other in the uncoupling angular region so that the first follower and the second follower do not establish a follower contact.

5. The vehicle seat frame structure of claim 1, wherein the spring device is a spiral spring.

6. The vehicle seat frame structure of claim 5, wherein the coupling device is arranged radially within an outer surface of the spiral spring.

7. The vehicle seat frame structure of claim 1, wherein the moment of the spring device about the pivot axis becomes smaller with a reduction of the inclination angle when approaching a lower limit of the uncoupling angular region and is zero at the lower limit of the uncoupling angular region.

8. The vehicle seat comprising at least one vehicle seat frame structure of claim 1.

* * * * *